United States Patent
Gill

(10) Patent No.: US 11,421,718 B2
(45) Date of Patent: Aug. 23, 2022

(54) TOGGLE CAM BOLT

(71) Applicant: Flexicon Corporation, Bethlehem, PA (US)

(72) Inventor: David R. Gill, Easton, PA (US)

(73) Assignee: Flexicon Corporation, Bethlehem, PA (US)

( * ) Notice: Subject to any disclaimer, the term of this patent is extended or adjusted under 35 U.S.C. 154(b) by 174 days.

(21) Appl. No.: 16/803,066

(22) Filed: Feb. 27, 2020

(65) Prior Publication Data

US 2020/0271145 A1 Aug. 27, 2020

Related U.S. Application Data

(60) Provisional application No. 62/811,185, filed on Feb. 27, 2019.

(51) Int. Cl.
*F16B 2/18* (2006.01)
*F16B 13/04* (2006.01)
*F16B 13/10* (2006.01)

(52) U.S. Cl.
CPC .............. *F16B 2/185* (2013.01); *F16B 13/04* (2013.01); *F16B 13/10* (2021.08)

(58) Field of Classification Search
CPC .......... F16B 2/185; F16B 13/04; F16B 13/10; F16B 2/18; F16B 13/0808
See application file for complete search history.

(56) References Cited

U.S. PATENT DOCUMENTS

| | | |
|---|---|---|
| 1,281,000 A | 10/1918 | Hayter |
| 2,157,345 A | 3/1938 | Nelson |
| 2,377,086 A | 5/1945 | Lang |
| 2,408,560 A | 10/1946 | Keehn |
| 3,107,571 A | 10/1963 | Burg |
| 3,168,850 A | 2/1965 | Tennican |
| 3,637,910 A | 7/1972 | Collister |
| 4,348,790 A | 9/1982 | Kuramoto et al. |
| 4,367,569 A | 1/1983 | Harmon |
| 4,400,038 A | 8/1983 | Hosokawa |
| 4,763,957 A | 8/1988 | Poehlmann et al. |
| 4,789,206 A | 12/1988 | Ozaki |
| 4,809,477 A * | 3/1989 | Gasser .................... E04D 5/143 411/342 |
| 7,661,767 B2 | 2/2010 | Montague et al. |
| 8,573,878 B2 * | 11/2013 | Chang .................... B62K 25/02 403/322.4 |
| 9,045,192 B2 * | 6/2015 | Schlanger .............. B62K 25/02 |
| 9,120,349 B2 * | 9/2015 | Chang .................. B60B 27/026 |
| 9,446,626 B2 * | 9/2016 | Schlanger ............. B60B 27/026 |
| 10,029,522 B1 * | 7/2018 | Gerhardt ................ B60D 1/025 |
| 10,293,637 B2 * | 5/2019 | Logan ................... B60B 27/026 |
| 2006/0182514 A1 | 8/2006 | Ito |

(Continued)

*Primary Examiner* — David M Upchurch
(74) *Attorney, Agent, or Firm* — Volpe Koenig

(57) ABSTRACT

A toggle cam bolt is provided including a shank, a cam lever, a recess, and a toggle. The shank includes a first end and a second end. The cam lever is rotatably attached to the first end by a first pivot pin. The cam lever includes a lever handle and a cam lobe that is eccentric relative to the first pivot pin. The recess is located at the second end of the shank. The toggle is attached to the recess so that it is rotatable about a second pivot pin. A method of clamping two or more parts together using a toggle cam bolt is also provided.

16 Claims, 12 Drawing Sheets

(56) References Cited

U.S. PATENT DOCUMENTS

2011/0176865 A1* 7/2011 Colby .................. F16L 23/036
 403/324
2013/0033096 A1* 2/2013 Howes .................. B62K 25/02
 301/124.2
2015/0367500 A1* 12/2015 Bukovitz ................. B25G 3/22
 248/514

* cited by examiner

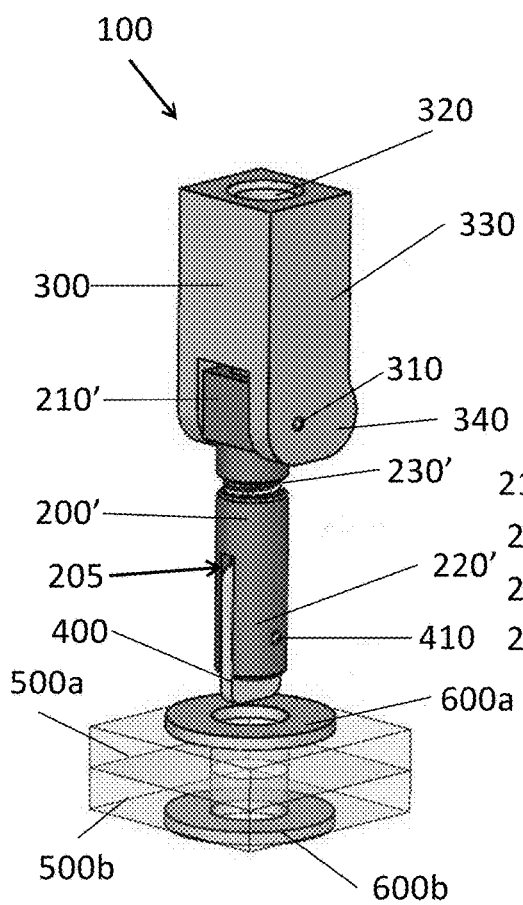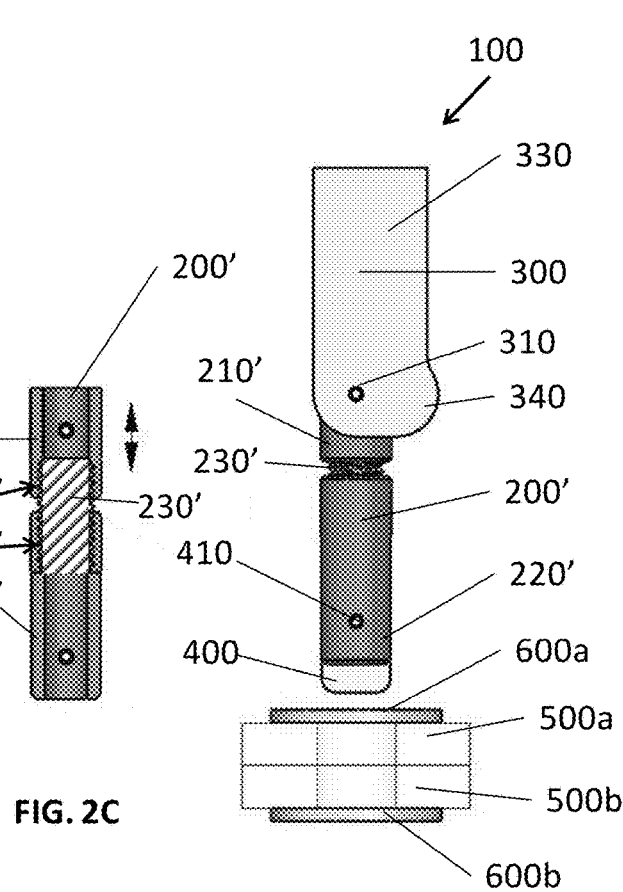
FIG. 2A    FIG. 2C    FIG. 2B

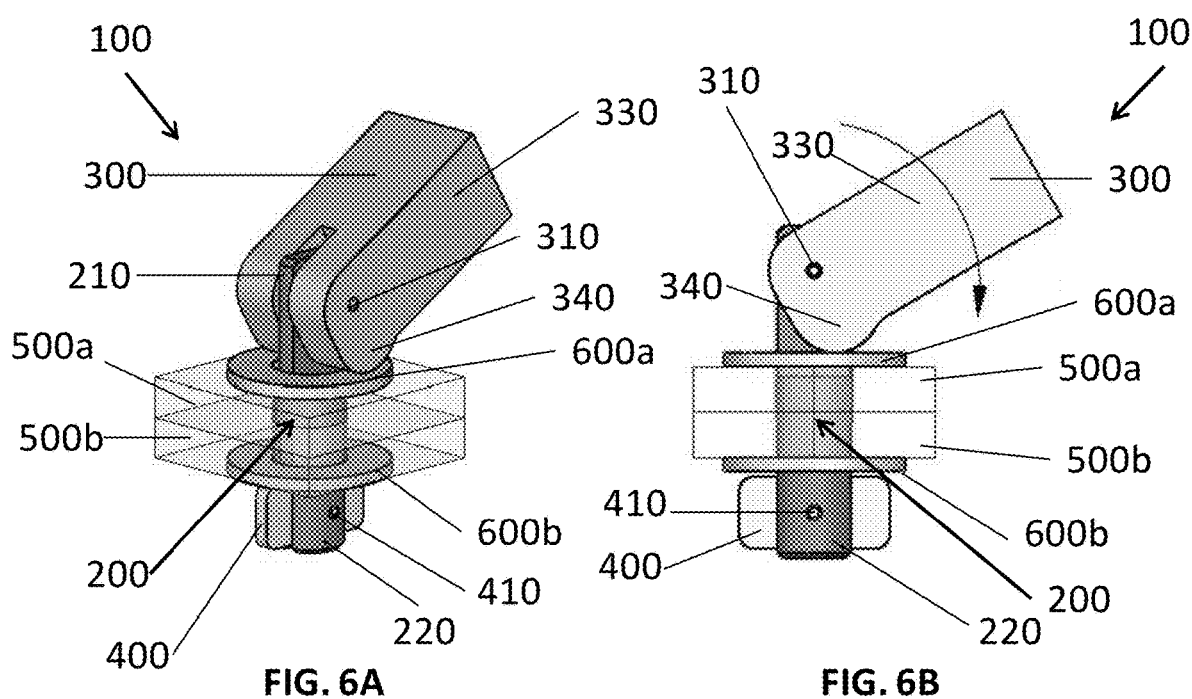

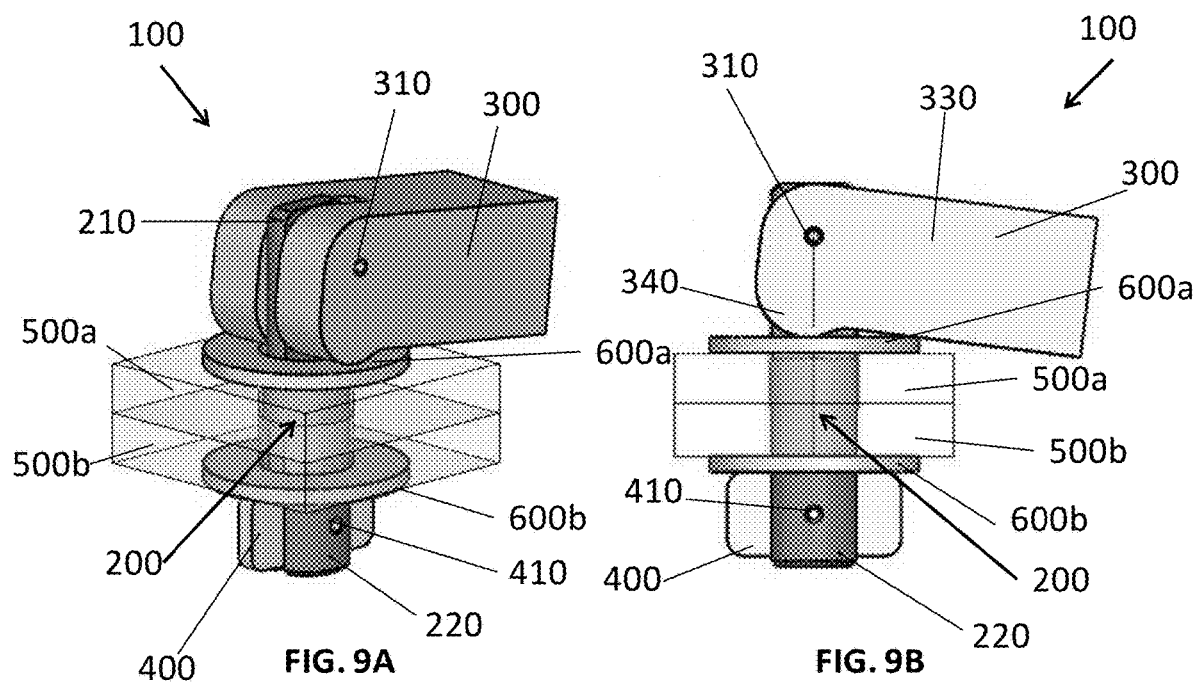

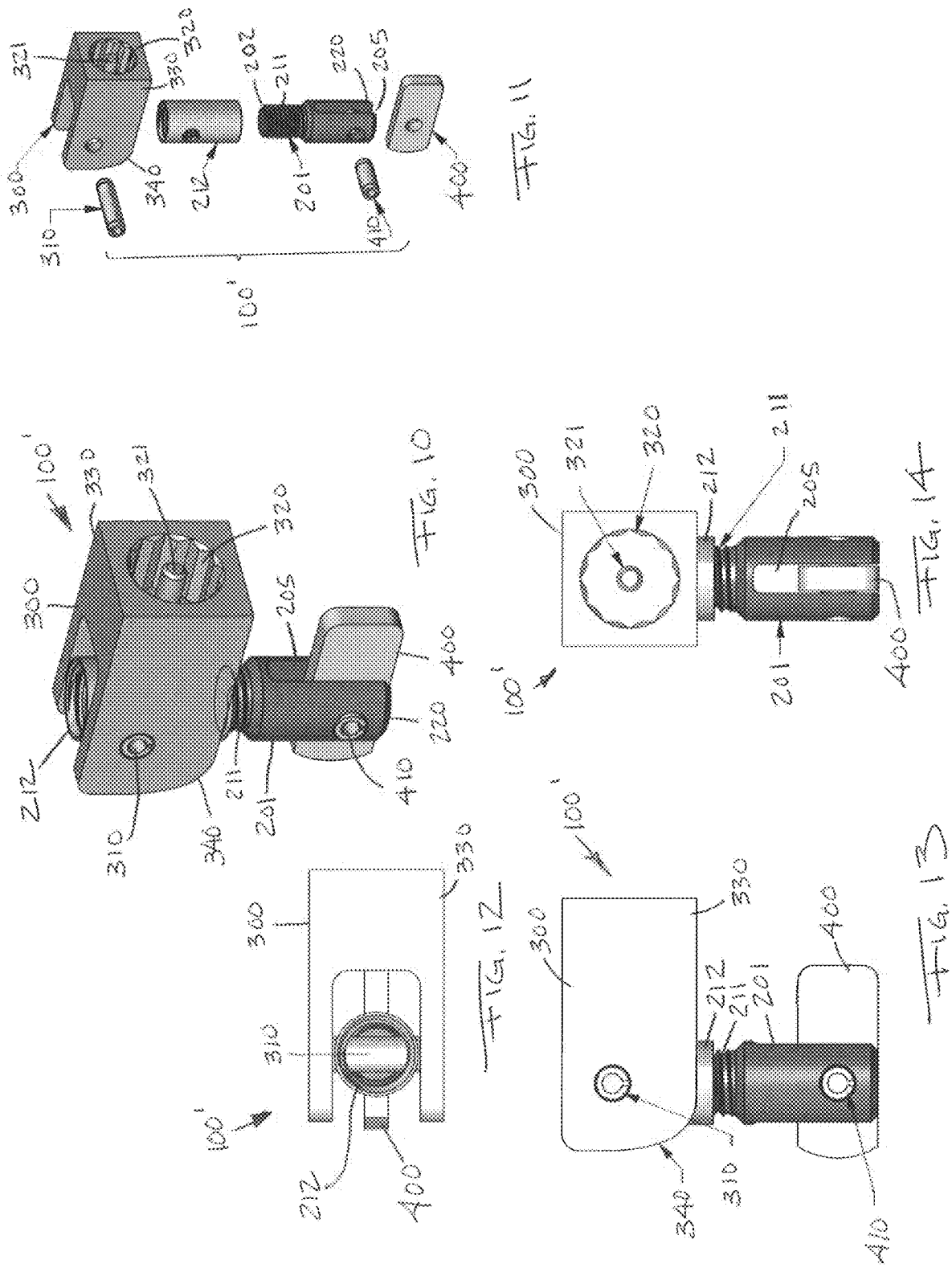

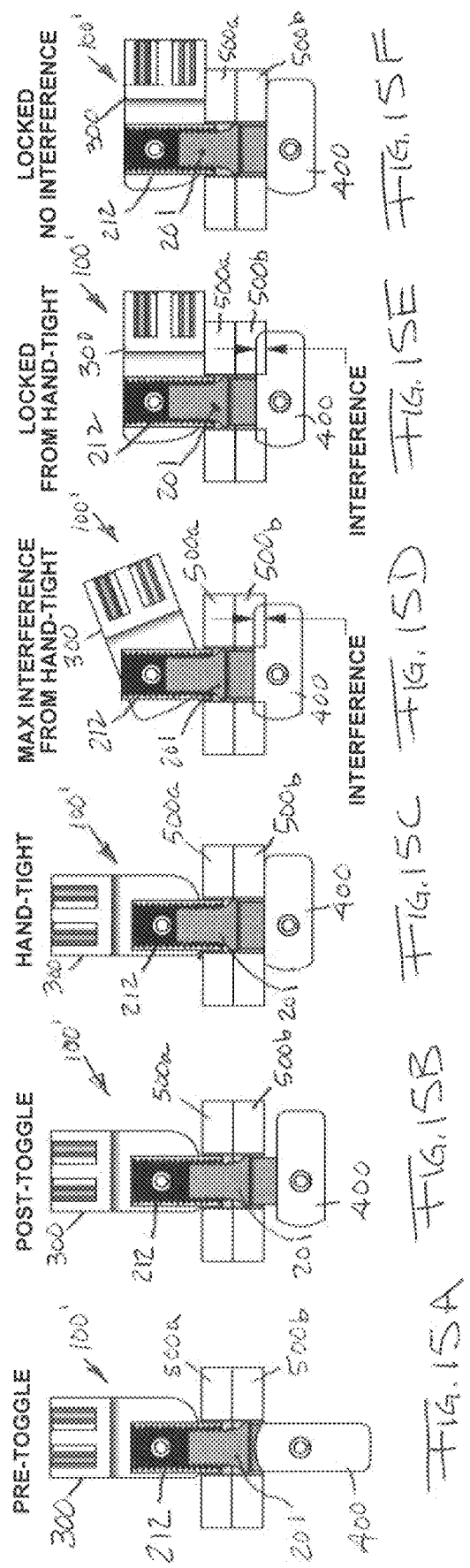

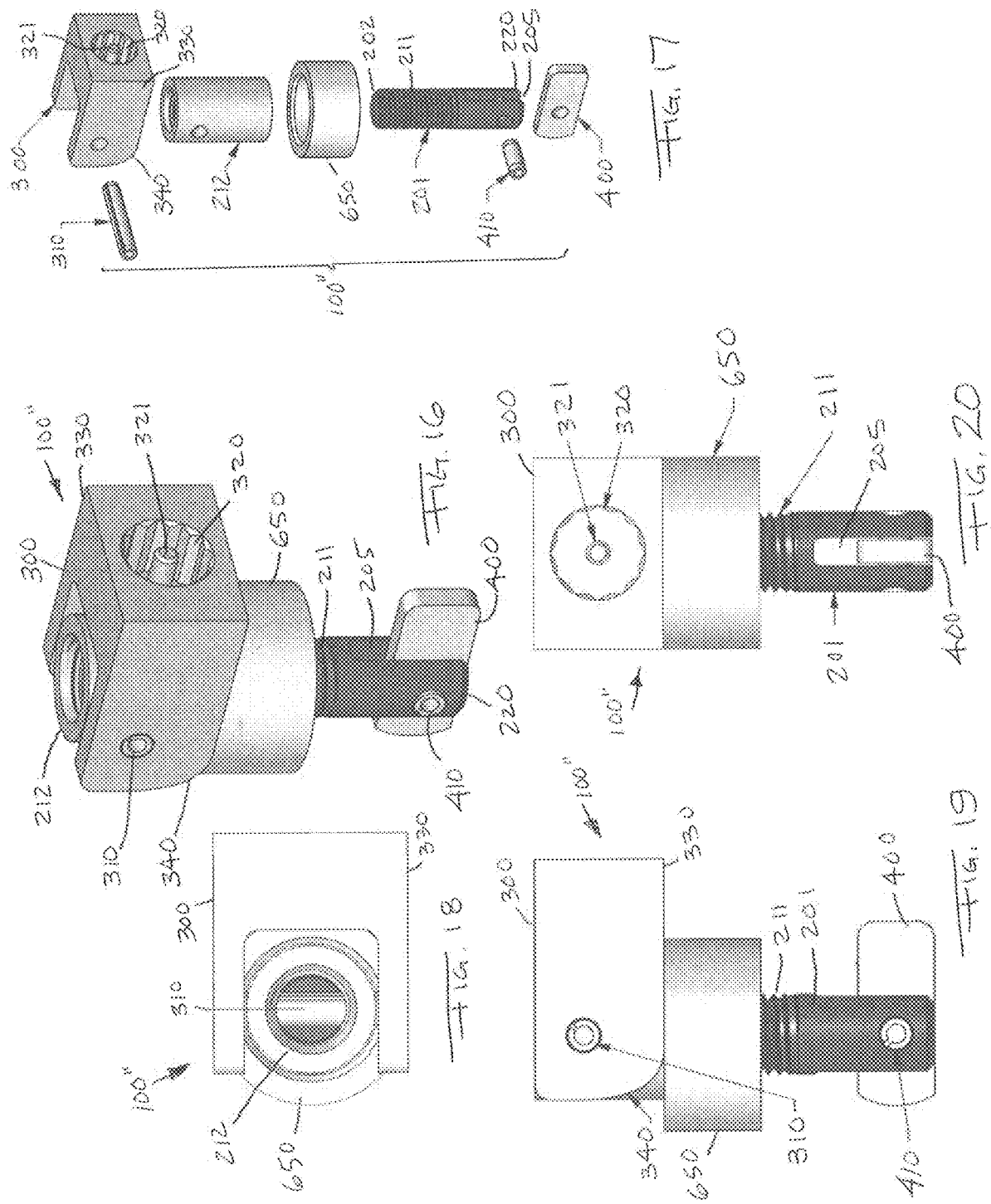

TOGGLE CAM BOLT

BACKGROUND

A cam bolt can be used to fasten or clamp multiple components together. A traditional cam bolt includes a bolt. The bolt is slid through aligned holes in the two or more components that will be joined or clamped together. Once the bolt protrudes through the aligned holes, a fastener, such as a bolt nut, is screwed on to the end of the bolt until tight. Once the fastener is tight, the cam lever is pushed down to further tighten the components together and lock the cam. Initially installing this type of cam bolt requires access to both side of the assembly. Further, tightening the fastener takes time and may require additional tools, such as a wrench. However, close clearances may make using such a tool difficult or impossible.

SUMMARY

A toggle cam bolt is provided including a shank, a cam lever, a recess, and a toggle. The shank includes a first end and a second end. The cam lever is rotatably attached to the first end by a first pivot pin. The cam lever includes a lever handle and a cam lobe that is eccentric relative to the first pivot axis. The recess is located at the second end of the shank. The toggle is attached to the recess using a second pivot pin so that it is rotatable about the second pivot pin.

In one embodiment, the toggle includes a length and a width, and the length is greater than the width. The width is preferably less than or equal to a diameter of the shank. In one embodiment, the toggle is rotatably attached to the recess at a center of the width and the length. The length of the toggle is in-line with the shank when the toggle is in an insertion position. The toggle is adapted to rotate relative to the shank, preferably by 90 degrees, into a clamping position. In one embodiment, the toggle may be pinned to the recess at an off-center location to promote self-pivoting out of the recess from the insertion position to the clamping position and for easier removal.

The cam lever is adapted to rotate between a clamped position and an unclamped position. The lever handle may include a tool insertion recess at a distal end that is adapted to receive a tool in order to provide greater leverage for clamping and unclamping. This allows the cam lever to be kept as short as possible for installation in tight spaces.

In one embodiment, the shank comprises a first shank part and a second shank part. The first pivot pin is in the first shank part, and the second pivot pin is in the second shank part. The first and second shank parts are connected to one another in an adjustable manner in order to allow a distance between the first pivot pin and the second pivot pin to be adjusted in order to accommodate different thicknesses of the parts being connected together by the toggle cam bolt. In one preferred arrangement, the first shank part includes a first threaded bore, and the second shank part includes a second threaded bore, and a threaded bolt is engaged in the first and second threaded bores.

In another embodiment, the first shank part comprises a barrel nut and the first pivot pin connects the barrel nut to the cam lever, and second shank part comprises a threaded shank having a first end with threads that are threadingly engaged in the barrel nut.

In another embodiment, a spacer can be located on the shank to provide a contact surface for the cam. The spacer can be an oil-impregnated bushing.

A method of clamping two or more parts together using a toggle cam bolt is also provided. The method includes providing a toggle cam bolt. The toggle cam bolt comprises the features previously discussed. The method also includes inserting the second end of the shank with the toggle in the insertion position through an opening in at least two adjacent parts until the toggle is past the opening. The method further includes rotating the toggle 90 degrees relative to the shank into a clamping position. The method also includes pushing the lever handle down towards the at least two parts until a point of contact of the cam lobe and the at least two parts is at least at, and preferably past, a centerline of the cam lobe.

In one embodiment, the method may also include adjusting a length of the shank such that a total thickness of the at least two parts being clamped is greater than a distance between the contact point of the cam lobe at a maximum distance from the first pivot pin and a contact surface of the toggle in the clamping position in order to provide a compressive pre-load force on the two parts being clamped in the clamping position.

The method may further include placing a first clamping washer between the at least two parts being clamped together and the cam lobe prior to inserting the toggle cam bolt. The method may also include placing a second clamping washer between the at least two parts and the toggle prior to rotating the toggle 90 degrees.

In one embodiment, the method may further comprise inserting a tool into a tool insertion recess at a distal end that is adapted to receive a tool in order to push the lever handle down.

The above-noted features can be used either alone or in various combinations with one another in order to provide the toggle cam bolt in accordance with the invention.

BRIEF DESCRIPTION OF THE DRAWINGS

The foregoing Summary as well as the following Detailed Description will be readily understood in conjunction with the appended drawings which illustrate preferred embodiments of the invention. In the drawings:

FIG. 2A is a perspective view of the toggle cam bolt having a second embodiment of a shank.

FIG. 2B is a side view of the toggle cam bolt of FIG. 2A.

FIG. 2C is a cross-section view of the second embodiment of the shank.

FIG. 6A is a perspective view of the toggle cam bolt with the cam lever partially rotated.

FIG. 6B is a side view of the toggle cam bolt with the cam lever partially rotated from FIG. 6A.

FIG. 9A is a perspective view of the toggle cam bolt with the cam lever in a clamped position.

FIG. 9B is a side view of the toggle cam bolt with the cam lever in the clamped position as shown in FIG. 9A.

FIGS. 10-14 are views of a second embodiment of the toggle cam bolt having an adjustable length shank.

FIGS. 15A-15F are a series of side views showing the installation of the second embodiment of the toggle cam bolt shown in FIGS. 10-14.

FIGS. 16-20 are views of a third embodiment of the toggle cam bolt having an adjustable length shank.

DETAILED DESCRIPTION

Figure 1A:
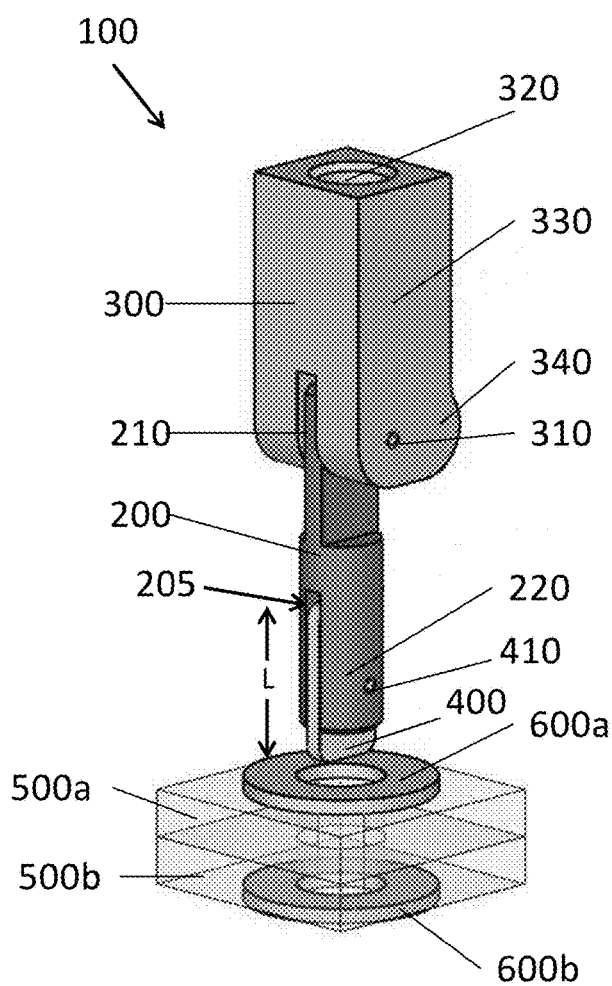
FIG. 1A is a perspective view of a toggle cam bolt having a first embodiment of a shank.

Certain terminology is used in the following description for convenience only and is not considered limiting. The words "right," "left," "top" and "bottom" designate directions in the drawings to which reference is made. This terminology includes the words specifically noted above, derivatives thereof and words of similar import.

Figure 1B:
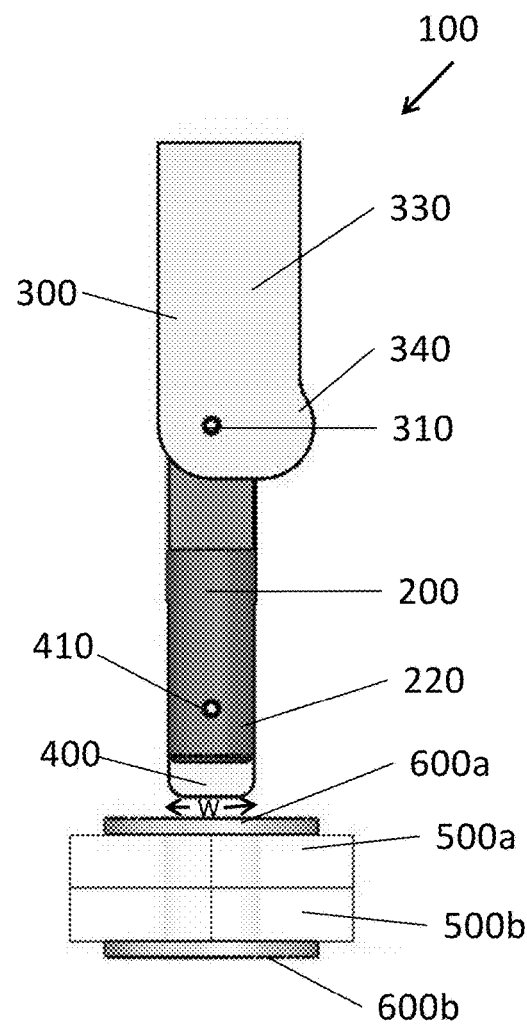
FIG. 1B is a side view of the toggle cam bolt of FIG. 1A.

As shown in FIGS. 1A and 1B, a toggle cam bolt 100 is provided. The toggle cam bolt 100 securely clamps two or more parts together. The toggle cam bolt 100 shown in FIGS. 1A and 1B can be used to clamp a first flange 500a and a second flange 500b together. An optional first clamping washer 600a and second clamping washer 600b are also provided. The toggle cam bolt 100 includes a shank 200, a cam lever 300, and a toggle 400. The shank 200 includes a first end 210 and a second end 220. The second end 220 of the shank 200 includes a recess 205. The recess 205 may be a depression into either side of the shank 200, or alternatively, the recess 205 may be a slot in the shank 200, as shown in FIG. 1A.

Figure 7A:
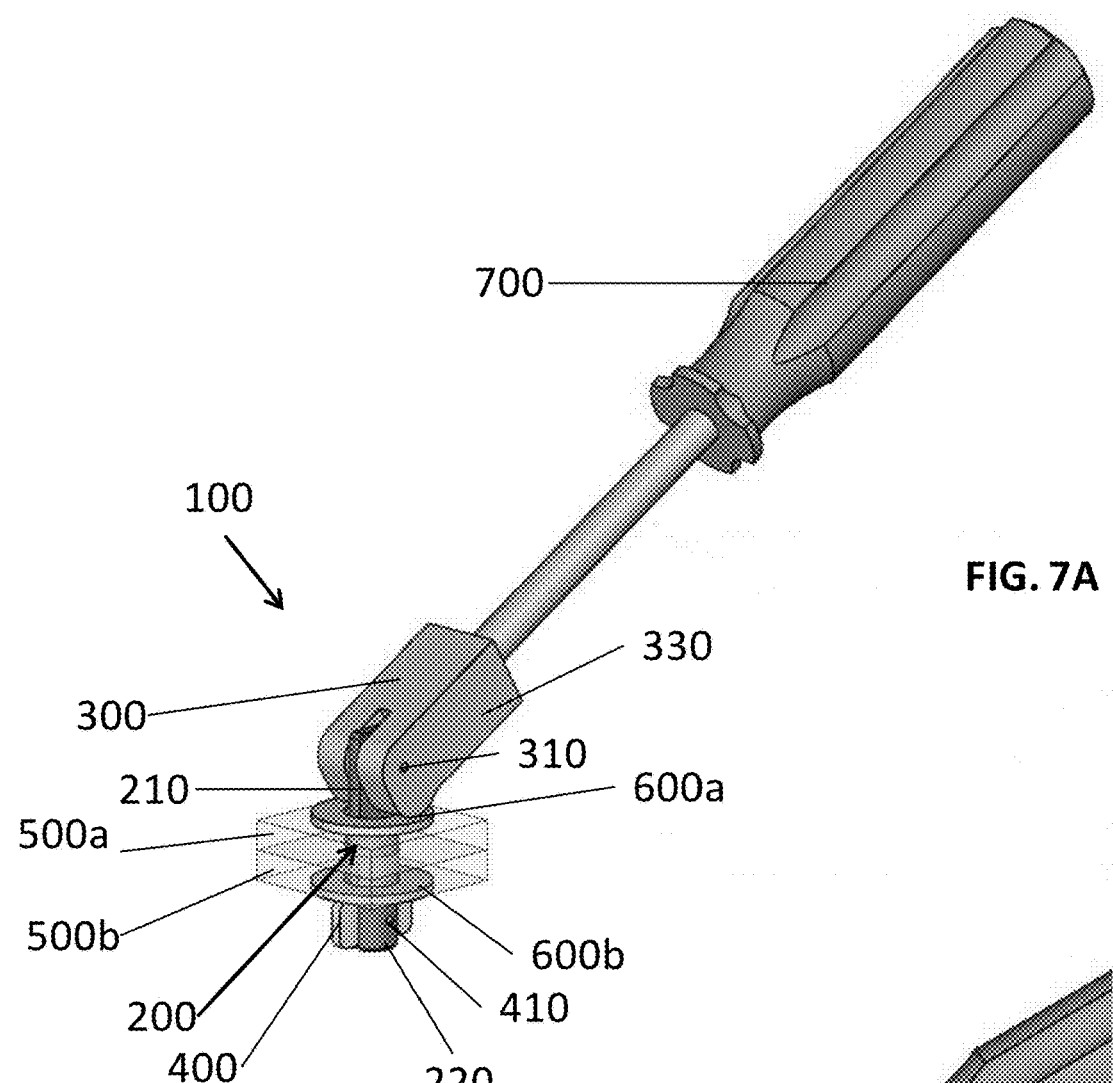
FIG. 7A is a perspective view of the toggle cam bolt with a tool inserted in the cam lever for clamping.
Figure 7B:
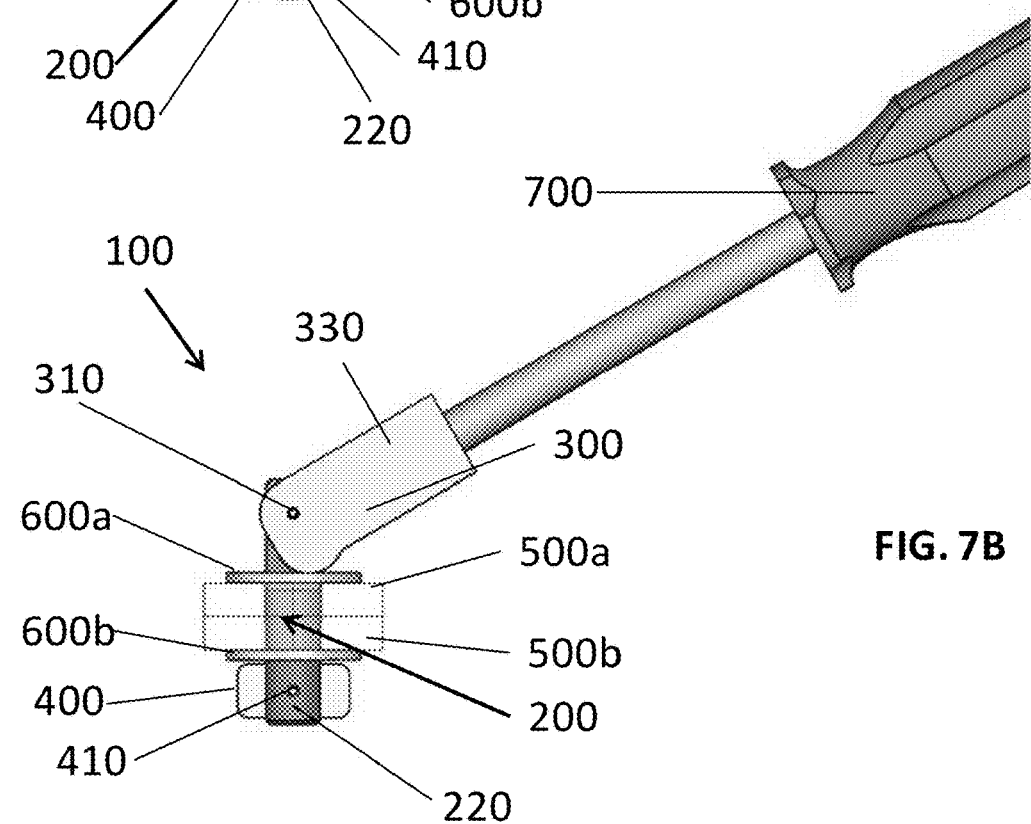
FIG. 7B is a side view of the toggle cam bolt with the tool inserted as shown in FIG. 7A.

The cam lever 300 is rotatably attached to the first end 210 of the shank 200 by a first pivot pin 310. The cam lever 300 is rotatable between an unclamped position and a clamped position. FIGS. 1A and 1B depict the cam lever 300 in an unclamped position. The cam lever 300 includes a lever handle 330 and a cam lobe 340. As shown in FIGS. 1A and 1B, the cam lobe 340 is located at an end of the cam lever 300 closest to the first pivot pin 310. The cam lobe 340 is eccentric relative to the first pivot pin 310 axis. The lever handle 330 extends away from the cam lobe 340. The lever handle 330 may be designed so that a user's hand can directly grasp the lever to rotate the cam lever 300 between the clamped and unclamped positions. Alternatively, as shown in FIG. 1A, the distal end of the cam lever 300 may include a tool insertion recess 320 that is adapted to receive a tool, such as shown in FIGS. 7A and 7B, in order to apply a rotating force to the cam lever 300. After the tool is inserted into the tool insertion recess 320, the cam lever 300 may be rotated between the clamped and unclamped positions by a hand pushing or pulling the tool.

Still with reference to FIGS. 1A and 1B, the cam toggle bolt 100 also includes a toggle 400 attached to the recess 205 in the second end 220 of the shank 200. The toggle 400 has a length L and a width W as shown in FIGS. 1A and 1B respectively. The length L is greater than the width W. The width W is preferably less than or equal to the diameter of the shank 200. The toggle 400 can rotate about a second pivot point 410. The toggle 400 rotates between an insertion position, as shown in FIGS. 1A and 1B, and a clamping position. When the toggle 400 is in the insertion position, the length L is in-line with the shank 200. The toggle 400 rotates to 90 degrees relative to the shank into the clamping position. As shown in FIGS. 1A and 1B, the toggle 400 may be attached to the recess 205 of the second end 220 within normal tolerances of the center of the length L and width W, thereby allowing the toggle 400 to rotate about its approximate center. Alternatively, the toggle 400 may be pinned to the recess 205 of the second end 220 at an off-center location to promote self-pivoting out of the recess 205 from the insertion position to the clamping position and to promote easier removal.

FIGS. 2A and 2B respectively show a perspective view and side view of the toggle cam bolt 100 with an adjustable shank 200'. FIG. 2C shows a cross-section view of the adjustable shank 200'. The shank 200' may include a first shank part 210' and a second shank part 220'. The first shank part 210' includes the first pivot pin 310, and the second shank part 220' includes the recess 205 and the second pivot pin 410. The first 210' and second 220' shank parts are connected to one another in an adjustable manner. This connection allows the distance between the first pivot pin 310 and the second pivot pin 410 to be adjusted. The shank 200' should be adjusted according to the thickness of the two or more parts to be clamped after the toggle cam bolt 100 is inserted. For example, after insertion the length of the shank 200' would be adjusted according to the thickness of the first clamping washer 600a, first flange 500a, second flange 500b, and second clamping washer 600b in FIGS. 2A and 2B.

As shown in the cross-section view in FIG. 2C, the first shank part 210' may include a first threaded bore 240'. The second shank park 220' may include a second threaded bore 250'. The first shank part 210' screws onto a first end of a threaded bolt 230', and the second shank part 220' screws onto a second end of the threaded bolt 230'. The threaded bolt 230' engages the first and second threaded bores 240', 250'. The length of the shank 200' is adjustable by screwing and unscrewing the first shank part 210' and/or the second shank part 220'. For example, after insertion, the length of the shank 200' may be adjusted by rotating the toggle 400 and then rotating the second shank part 220' to a tighter position. Although FIGS. 2A and 2B depict an adjustable shank 200' with a first shank part 210', a second shank part 220', and a threaded bolt 230', one skilled in the art would appreciate and understand that there are numerous designs for an adjustable shank 200'. For example, the first shank part 210' may include a threaded end that screws into a second shank part 220' with a threaded bore end, or vice versa.

FIGS. 3A, 3B-9A, 9B depict a process of clamping two or more parts, in this case a first flange 500a and a second flange 500b, with a toggle cam bolt 100. Although FIGS. 3A, 3B-9A, 9B depict the process of clamping two or more parts with a toggle cam bolt 100 with a shank 200, the process may be replicated with a toggle cam bolt 100 with an adjustable shank 200'.

Figure 3A:
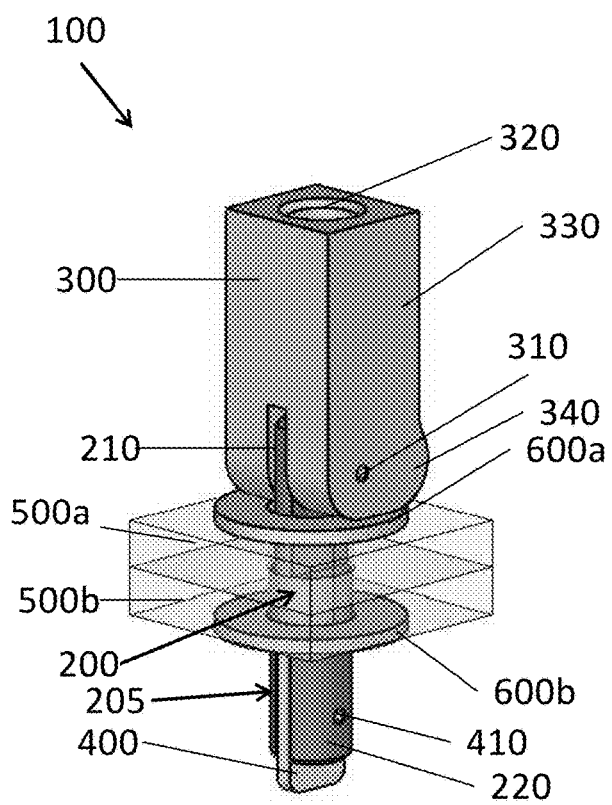
FIG. 3A is a perspective view of the toggle cam bolt being inserted through two or more parts with the toggle aligned with the shank.
Figure 3B:
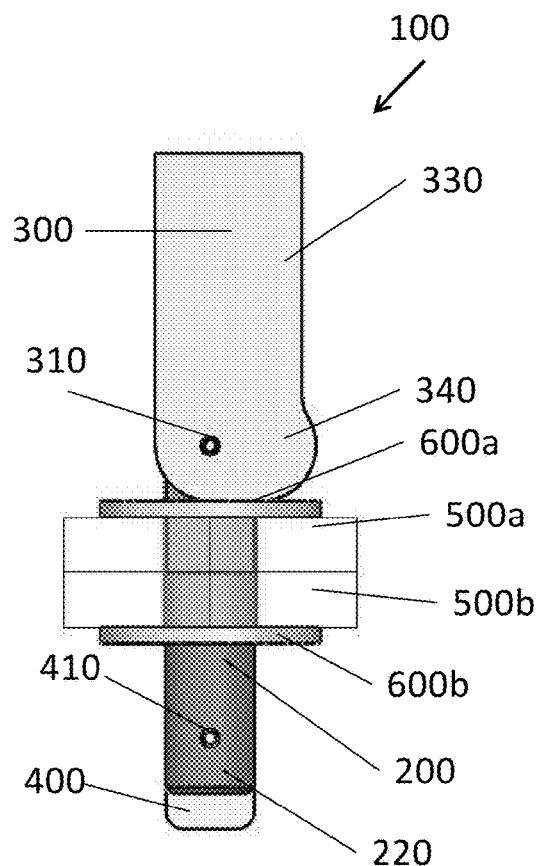
FIG. 3B is a side view of the toggle cam bolt inserted through two or more parts as shown in FIG. 3A.

FIGS. 3A and 3B respectively show the toggle cam bolt 100 being inserted through the two or more parts, which in this case includes a first clamping washer 600a, first flange 500a, second flange 500b, and second clamping washer 600b. As shown in FIGS. 3A and 3B, the shank 200 of the toggle cam bolt 100 extends through an opening in the two or more parts. The shank 200 is inserted through the opening until the lever-side end of the toggle 400 is past the bottom surface of the bottom most part, which in this case is the bottom of the second clamping washer 600b. The washers 600a, 600b are optional and can be used to offer a tight-fitting hole for the shank 200 and toggle 400 to pass through and to provide a minimum hole space so the toggle 400 in the clamping position can engage with a surface. If the openings in the flanges or other parts being connected are a tight slip fit to the shank 200, the washers 500a, 500b can be omitted. The cam lever 300 may come into contact with the top surface of the top most part, which in the illustrated embodiment is the top of the first clamping washer 600a. As shown in FIGS. 3A and 3B, the toggle 400 remains in the insertion position and the cam lever 300 remains in the unclamped position while the shank 200 is inserted through the opening in the two or more parts.

Figure 4A:
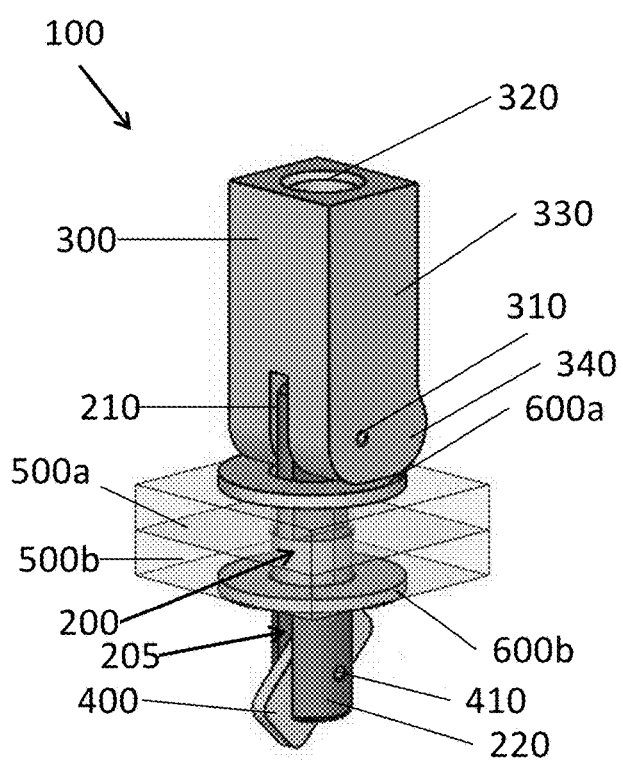
FIG. 4A is a perspective view of the toggle cam bolt with the toggle being rotated to the clamping position.
Figure 4B:
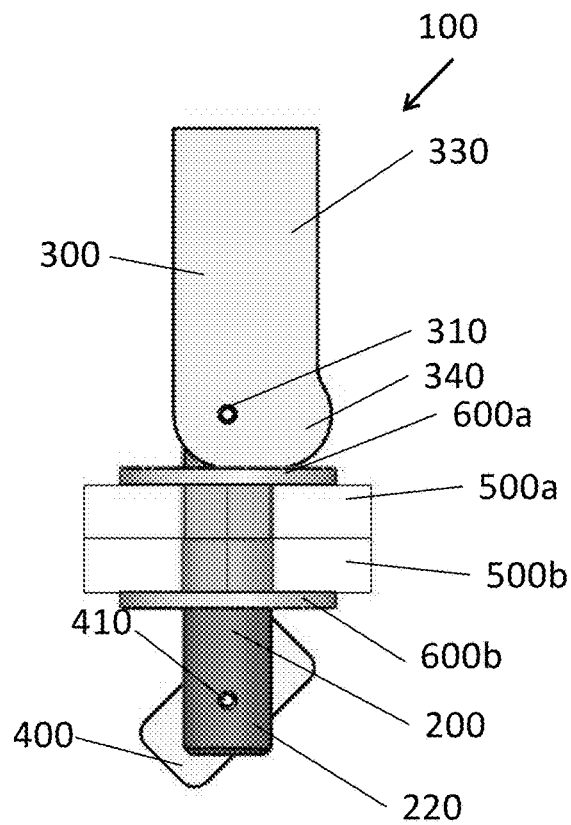
FIG. 4B is a side view of the toggle cam bolt with the toggle rotated from FIG. 4A.

FIGS. 4A and 4B respectively show the toggle 400 rotating after the shank 200 is inserted through the two or more parts. The toggle 400 rotates about the second pivot pin 410, and can be manually rotated, or in the case of an optionally off-center position of the second pivot pin 410, can rotate by gravity possibly assisted by tapping or rattling movement of the cam lever 300. FIGS. 4A and 4B show the toggle 400 rotated to a position between the insertion position, as shown in FIGS. 3A and 3B, and a clamping position. The cam lever 300 remains in the unclamped position while the toggle 400 is rotated.

Figure 5A:
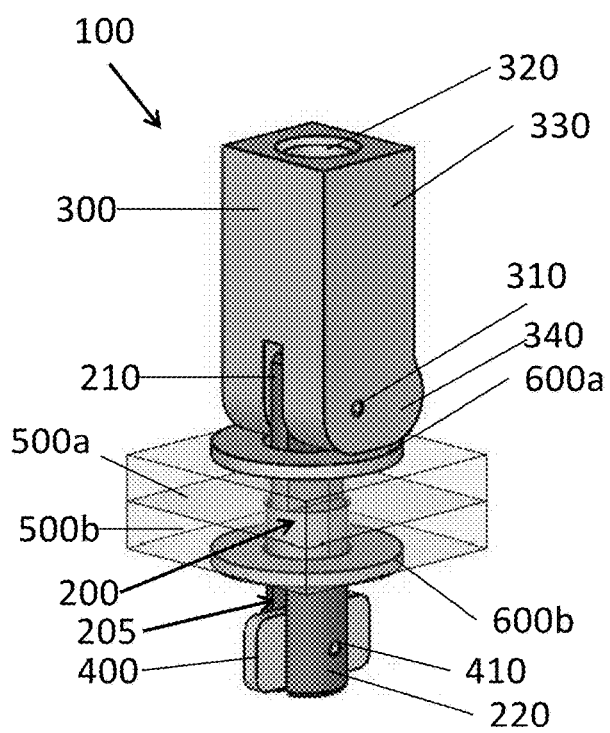
FIG. 5A is a perspective view of the toggle cam bolt with the toggle rotated approximately 90 degrees into the clamping position.
Figure 5B:
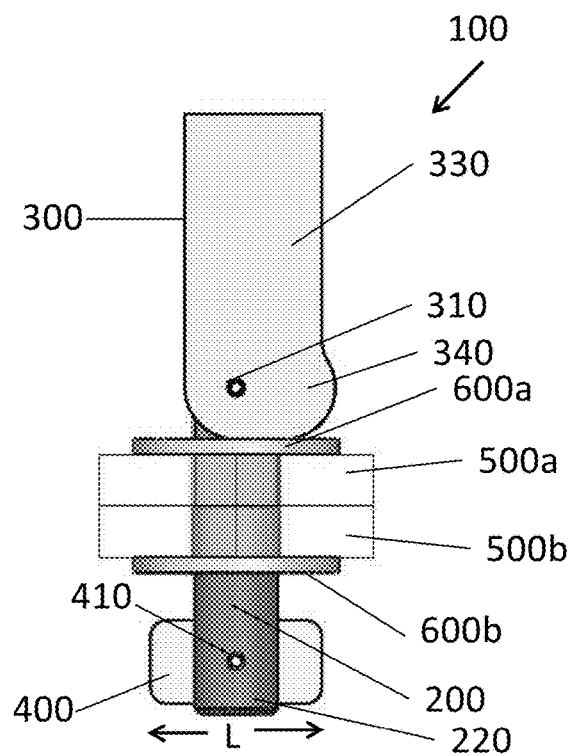
FIG. 5B is a side view of the toggle cam bolt with the toggle rotated approximately 90 degrees from FIG. 5A.

FIGS. 5A and 5B respectively show the toggle 400 rotated to the clamping position. As shown in FIG. 5B, when the toggle 400 is rotated to the clamping position, the length L of the toggle 400 is preferably at approximately 90 degrees or perpendicular to the shank 200. At this point, the cam lever 300 is still in the unclamped position.

FIGS. 6A and 6B respectively show the cam lever 300 rotating. The cam lever 300 rotates about the first pivot pin 310. As the cam lever 300 rotates, the surface of the cam lobe 340 contacts the top surface of the top most part, which in this case is the top of the first clamping washer 600a. It may be possible to rotate the cam lever 300 to this position by pushing or pulling the lever handle 300 by hand. At this point the cam lever 300 is still in the unclamped position. Further, in the case of the adjustable shank 200', the clamping length can be adjusted by rotating the first shank part 210' relative to the second shank part 220' so that positive contact is generated such that further movement of the cam lever 300 to the clamping position, as discussed below, generates a pre-load force on the two or more parts as they are clamped.

To facilitate rotating the cam lever 300 to the clamped position, a tool 700 may be inserted into the tool insertion recess 320 at the distal end of the cam lever 300 as shown in FIGS. 7A and 7B. The tool 700 ultimately adds length to the lever handle 330 and its configuration can be varied. The added length of the tool 700 makes it easier to rotate the cam lever 300 between an unclamped position and a clamped position. While the tool 700 is illustrated as being a straight bar with a handle, it could be bent at different angles at each end in order to allow access into narrow or difficult to access spaces, and the ends could include a splined shape for engagement in a complementary splined opening used to form the tool insertion recess 320 in the end of the lever handle 300.

Figure 8A:
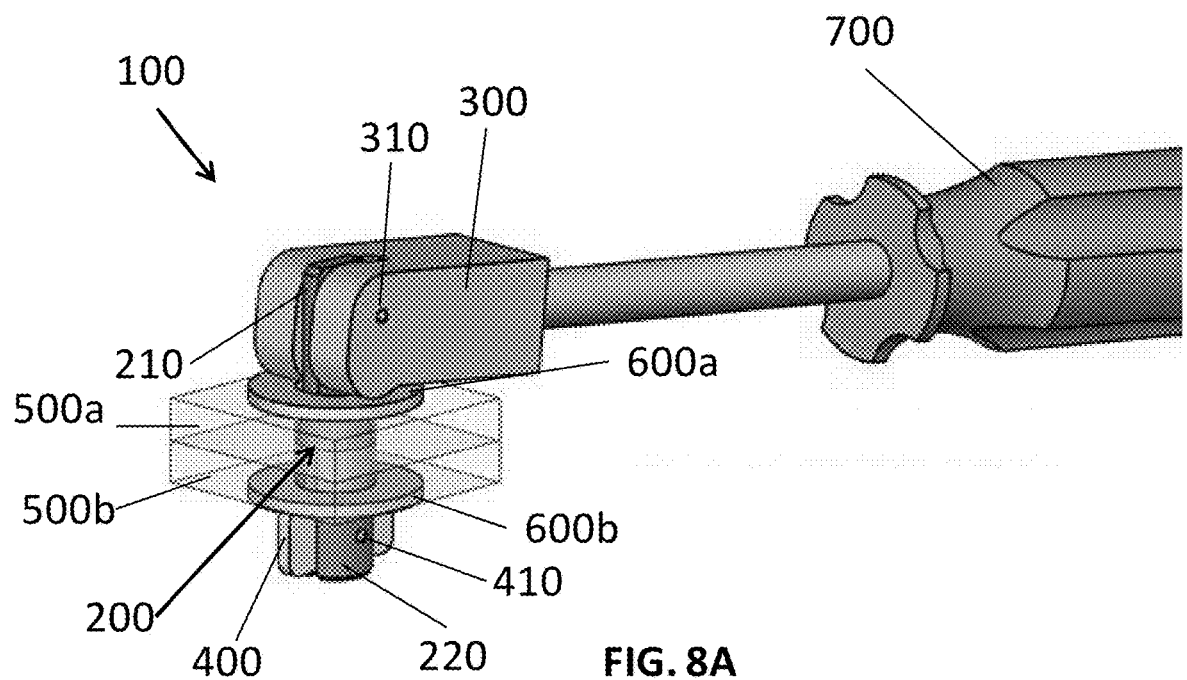
FIG. 8A is a perspective view of the toggle cam bolt further rotated by the tool to the clamped position.
Figure 8B:
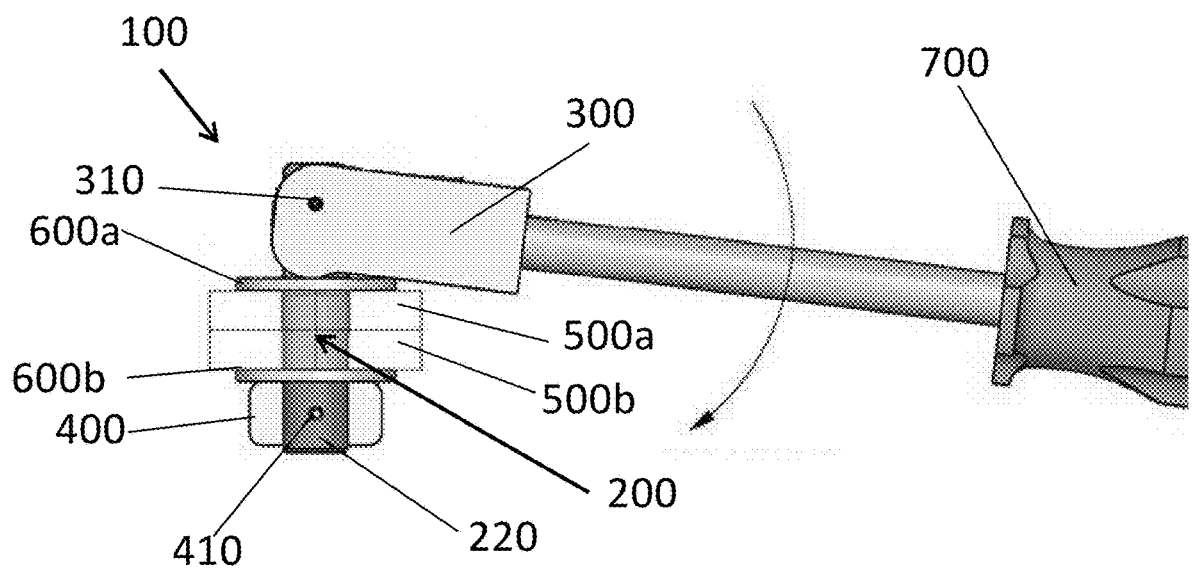
FIG. 8B is a side view of the toggle cam bolt further rotated by the tool to the clamped position as shown in FIG. 8A.

A user may then pull or push the tool 700 to rotate the cam lever 300 to a clamped position as shown in FIGS. 8A and 8B.

FIGS. 9A and 9B respectively show the cam lever 300 in the clamped position. After the cam lever 300 is rotated to the clamped position, the tool 700 is extracted from the tool insertion recess 320. As shown in FIG. 9B, the contact point between the surface of the cam lobe 340 and the top surface of the top most part is preferably located past the axis of the first pivot point 310 and cam lobe 340 thereby locking the cam lever 300 in the clamped position. The cam lobe 340 must be able to reach the clamped position before the cam lever 300 is stopped from rotating and the length is preferably adjusted accordingly. In one preferred application, the cam lobe 340 reaches the clamped position before the cam lever 300 hits the flange that the toggle cam bolt 100 is fastening. As shown in FIGS. 9A and 9B, the first clamping washer 600a, first flange 500a, second flange 500b, and second clamping washer 600b are clamped together by the toggle 400 and the cam lobe 340. Use of the tool 700 allows the lever to be relatively short while still generating a high clamping force.

Although not shown, the toggle cam bolt 100 may be unclamped and extracted from the two or more parts by performing the method depicted in FIGS. 2A, 2B-9A, 9B in reverse.

Referring now to FIGS. 10-14, a second embodiment of a toggle cam bolt 100' is shown that is similar to the toggle cam bolt 100. Similar elements have been designated with the same reference numerals. The toggle cam bolt 100' includes a threaded shank 201 and a barrel nut 212 that together form an adjustable shank, as well as a cam lever 300 and a toggle 400. The threaded shank 201 includes a first end 202 having threads 211, and a second end 220. The first end 202 is threadingly engaged in the barrel nut 212. The second end 220 of the threaded shank 200 includes a recess 205. The recess 205 may be a depression into either side of the shank 200, or alternatively, the recess 205 may be a slot in the shank 200, as shown in FIGS. 10-12.

A toggle 400 is attached to the recess 205 in the second end 220 of the threaded shank 201 with the second pivot pin 410. The toggle 400 has a length L and a width W as shown, similar to that described above in connection with the first embodiment. Specifically, the length L is greater than the width W. The width W is preferably less than or equal to the diameter of the threaded shank 201. The toggle 400 can rotate about the second pivot point 410. The toggle 400 rotates between an insertion position, as shown in FIG. 15A and a clamping position shown in FIG. 15B. When the toggle 400 is in the insertion position, the length L is in-line with the threaded shank 201. The toggle 400 rotates to 90 degrees relative to the shank into the clamping position. As shown in FIGS. 10, 11, 13, and 14, the toggle 400 is attached to the recess 205 at the second end 220 in an off-center position of the length L to promote self-pivoting out of the recess 205 from the insertion position to the clamping position and to promote easier installation and removal.

The cam lever 300 is rotatably attached to the barrel nut 212 by the first pivot pin 310, with the barrel nut being pivotably located in a slot in the cam lever 300. The cam lever 300 is rotatable between an unclamped position and a clamped position. FIGS. 15A-15C depict the cam lever 300 in an unclamped position. The cam lever 300 includes a lever handle 330 and a cam lobe 340. As shown in FIGS. 10 and 13, the cam lobe 340 is located at an end of the cam lever 300 closest to the first pivot pin 310. The cam lobe 340 is eccentric relative to the first pivot pin 310 axis. The lever handle 330 extends away from the cam lobe 340. Here, the lever handle 330 includes a tool insertion recess 320 that is adapted to receive a tool, such as shown in FIGS. 7A and 7B, in order to apply a rotating force to the cam lever 300. Here, as shown in FIGS. 10, 11, and 14, the tool insertion recess includes a security pin 321 so that only the correct mating tool can be used.

The second embodiment of the toggle cam bolt 100' provides for more adjustability during installation in order to allow for adjustment for different thicknesses of the flanges 500a, 500b being connected. A preferred installation sequence is shown in FIGS. 15A-15F. In FIG. 15A, the toggle cam bolt 100' is inserted through aligned holes in two flanges 500a, 500b. The pre-toggle position is shown with the toggle 400 still aligned with the threaded shank 201. FIG. 15B shows the post toggle position, with the toggle 400 having rotated out of alignment with the threaded shank 201. This can be accomplished by gravity depending on the orientation of the flanges 500a, 500b, or by a tapping or rattling movement of the cam lever 300. As shown in FIG. 15C, the cam lever 300 is rotated about an axis of the threaded shank 201 in order to tighten the threaded shank 201 in the barrel nut 212 so that the toggle 400 is drawn up into contact with the underside of the second flange 500b being clamped. This is referenced as a hand tight position. As shown in FIG. 15D, the cam lever 300 is then rotated from the unclamped position toward the clamped positions by a hand pushing on the lever 300 or by using a tool inserted into the tool insertion recess 320. FIG. 15D shows a "Max Interference" position from hand tight based on the configuration of the cam 340. This is to illustrate the pre-load generated by the elastic elongation of the threaded shank 201 generating a pre-loaded condition as the toggle 400 does not actually deform or penetrate into the surface of the second flange 500b. FIG. 15E shows the toggle cam bolt 100' in the "Locked Position" from hand tight. Here there is still a pre-load, illustrated by the interference condition, but it is backed off from the maximum pre-loaded condition shown in FIG. 15D. FIG. 15F is representative of the actual locked condition with no interference being illustrated.

Referring now to FIGS. 16-20, a third embodiment of a toggle cam bolt 100" is shown that has basically the same configuration as the second embodiment of the toggle cam bolt 100'. Similar elements have been designated with the same reference numerals, and the descriptions of these elements have not been repeated. The toggle cam bolt 100" also includes the threaded shank 201 and the barrel nut 212 that form an adjustable shank, as well as the cam lever 300 and the toggle 400.

The toggle 400, as described above, is attached to the recess 205 in the second end 220 of the threaded shank 201 with the second pivot pin 410, and can rotate about the second pivot point 410. Here, the toggle 400 is attached to the recess 205 at the second end 220 in an off-center position of the length L to promote self-pivoting out of the recess 205 from the insertion position to the clamping position and to promote easier installation and removal.

The cam lever 300 is rotatably attached to the barrel nut 212 by the first pivot pin 310, with the barrel nut 212 being pivotably located in the slot in the cam lever 300. The cam lever 300 is rotatable between an unclamped position and a clamped position. The third embodiment of the toggle cam bolt 100" is shown with an optional spacer 650, which can be an oil impregnated bushing. The cam lobe 340 acts on the spacer 340 during clamping.

The third embodiment of the toggle cam bolt 100" also provides for more adjustability during installation in order to allow for adjustment for different thicknesses of the flanges 500a, 500b being connected. Further adjustment can be made to the thickness being clamped by using spacer(s) 650 having different thicknesses. Additionally, the spacer 650 could be used in order to allow for a longer barrel nut 212 in order to achieve greater thread engagement for higher clamping forces.

The installation sequence is the same as shown in FIGS. 15A-15F in connection with the second embodiment of the toggle cam bolt 100', except that the spacer(s) 650 is(are) added onto the threaded shank 201 prior to insertion of the first end 220 with the toggle 400 into the aligned holes in the flanges 500a, 500b being clamped.

It will be appreciated by those skilled in the art that changes can be made to the embodiments of the invention described above without departing from the broad inventive concept thereof. It is also understood that various portions of the invention can be used alone or in combination and that not all of the components are required for any particular application. It is therefore understood that this invention is not limited to the particular embodiments disclosed, but it is intended to cover modifications within the spirit and scope of the present invention.

What is claimed is:

1. A toggle cam bolt comprising:
   a shank including a first end and a second end;
   a cam lever rotatably attached to the first end by a first pivot pin, the cam lever including a lever handle and a cam lobe that is eccentric relative to the first pivot pin;
   a recess located at the second end of the shank;
   a toggle attached in the recess so that the toggle is rotatable about a second pivot pin; and
   the lever handle includes a tool insertion recess at a distal end that is adapted to receive a tool.

2. The toggle cam bolt of claim 1, wherein the toggle includes a length and a width, and the length is greater than the width.

3. The toggle cam bolt of claim 2, wherein the width is less than or equal to a diameter of the shank.

4. The toggle cam bolt of claim 2, wherein the toggle is rotatably attached to the recess at a center of the width and the length.

5. The toggle cam bolt of claim 2, wherein the length of the toggle is in-line with the shank when the toggle is in an insertion position.

6. The toggle cam bolt of claim 5, wherein the toggle is adapted to rotate 90 degrees relative to the shank into a clamping position.

7. The toggle cam bolt of claim 6, wherein the toggle is pinned to the recess at an off-center location to promote self-pivoting out of the recess from the insertion position to the clamping position.

8. The toggle cam bolt of claim 1, wherein the cam lever is adapted to rotate between a clamped position and an unclamped position.

9. A toggle cam bolt comprising:
   a shank including a first end and a second end;
   a cam lever rotatably attached to the first end by a first pivot pin, the cam lever including a lever handle and a cam lobe that is eccentric relative to the first pivot pin;
   a recess located at the second end of the shank; and
   a toggle attached in the recess so that the toggle is rotatable about a second pivot pin;
   wherein the shank comprises a first shank part and a second shank part, the first pivot pin is in the first shank part and the second pivot pin is in the second shank part, the first and second shank parts are connected to one another in an adjustable manner in order to allow a distance between the first pivot pin and the second pivot pin to be adjusted; and the first shank part includes a first threaded bore and the second shank part includes a second threaded bore, and a threaded bolt is engaged in the first and second threaded bores.

10. A toggle cam bolt comprising:
a shank including a first end and a second end;
a cam lever rotatably attached to the first end by a first pivot pin, the cam lever including a lever handle and a cam lobe that is eccentric relative to the first pivot pin;
a recess located at the second end of the shank; and
a toggle attached in the recess so that the toggle is rotatable about a second pivot pin;
wherein the shank comprises a first shank part and a second shank part, the first pivot pin is in the first shank part and the second pivot pin is in the second shank part, the first and second shank parts are connected to one another in an adjustable manner in order to allow a distance between the first pivot pin and the second pivot pin to be adjusted; and
the first shank part comprises a barrel nut and the first pivot pin connects the barrel nut to the cam lever, and second shank part comprises a threaded shank having a first end with threads that are threadingly engaged in the barrel nut.

11. The toggle cam bolt of claim 1, further comprising a spacer located on the shank.

12. A method of clamping two or more parts together using a toggle cam bolt comprising:
providing a toggle cam bolt, the toggle cam bolt including a shank including a first end and a second end, a cam lever rotatably attached to the first end by a first pivot pin, the cam lever including a lever handle and a cam lobe that is eccentric relative to the first pivot pin, a recess located at the second end of the shank, and a toggle attached in the recess so that the toggle is rotatable about a second pivot pin, the toggle having a length greater than a width, and the length is in-line with the shank when the toggle is in an insertion position;
inserting the second end of the shank with the toggle in the insertion position through an opening in at least two adjacent parts until the toggle is past the opening;
rotating the toggle relative to the shank into a clamping position;
rotating the lever handle towards the at least two parts until a point of contact of the cam lobe and the at least two adjacent parts is at or past a centerline of the cam lobe; and
inserting a tool into a tool insertion recess at a distal end of the lever handle that is adapted to receive a tool in order to push the lever handle down.

13. The method of claim 12, further comprising adjusting a length of the shank such that a total thickness of the at least two adjacent parts being clamped is greater than a distance between the contact point of the cam lobe at a maximum distance from the first pivot pin and a contact surface of the toggle in the clamping position in order to provide a compressive pre-load force on the two parts being clamped in the clamping position.

14. The method of claim 12, further comprising placing a first clamping washer or a spacer between the at least two parts being clamped together and the cam lobe prior to inserting the toggle cam bolt.

15. The method of claim 12, further comprising placing a second clamping washer between the at least two parts and the toggle prior to rotating the toggle 90 degrees.

16. A method of clamping two or more parts together using a toggle cam bolt comprising:
providing a toggle cam bolt, the toggle cam bolt including a shank including a first end and a second end, a cam lever rotatably attached to the first end by a first pivot pin, the cam lever including a lever handle and a cam lobe that is eccentric relative to the first pivot pin, a recess located at the second end of the shank, and a toggle attached in the recess so that the toggle is rotatable about a second pivot pin, the toggle having a length greater than a width, and the length is in-line with the shank when the toggle is in an insertion position;
inserting the second end of the shank with the toggle in the insertion position through an opening in at least two adjacent parts until the toggle is past the opening;
rotating the toggle relative to the shank into a clamping position;
rotating the lever handle towards the at least two parts until a point of contact of the cam lobe and the at least two adjacent parts is at or past a centerline of the cam lobe;
wherein the shank comprises a first shank part and a second shank part, the first pivot pin is in the first shank part and the second pivot pin is in the second shank part, the first and second shank parts are connected to one another in an adjustable manner in order to allow a distance between the first pivot pin and the second pivot pin to be adjusted; and
  (a) the first shank part includes a first threaded bore and the second shank part includes a second threaded bore, and a threaded bolt is engaged in the first and second threaded bores, or
  (b) the first shank part comprises a barrel nut and the first pivot pin connects the barrel nut to the cam lever, and second shank part comprises a threaded shank having a first end with threads that are threadingly engaged in the barrel nut; and
the method further comprising adjusting the distance between the first pivot pin and the second pivot pin to accommodate a thickness of the two or more parts being clamped.

* * * * *